United States Patent
Pfleuger et al.

(10) Patent No.: US 6,400,060 B1
(45) Date of Patent: Jun. 4, 2002

(54) ELECTRICAL MACHINE WITH STATOR AND CLAW POLE ROTOR SYSTEM

(75) Inventors: Gerhard Pfleuger, Markgroeningen; Stefan Lober, Furtwaenglerstrasse, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/975,514

(22) Filed: Nov. 21, 1997

Related U.S. Application Data

(63) Continuation of application No. 08/663,165, filed as application No. PCT/DE94/01463 on Dec. 9, 1994, now abandoned.

(30) Foreign Application Priority Data

Dec. 16, 1993 (DE) .......................... 43 42 870

(51) Int. Cl.[7] ............................ H02K 19/24; H02K 1/24
(52) U.S. Cl. ....................................... 310/263; 310/266
(58) Field of Search ............................ 310/263, 257, 310/266

(56) References Cited

U.S. PATENT DOCUMENTS

| | | | | | |
|---|---|---|---|---|---|
| 2,196,682 A | * | 4/1940 | Nowosielski | ............... | 310/263 |
| 2,651,733 A | * | 9/1953 | Stark | ........................ | 310/263 |
| 3,047,754 A | * | 7/1962 | Jaeschke | .................... | 310/103 |
| 3,215,878 A | * | 11/1965 | Woodward, Jr. | ............ | 310/263 |
| 3,591,816 A | * | 7/1971 | Sakamoto et al. | ............ | 310/58 |
| 3,617,782 A | * | 11/1971 | Nakamura et al. | ............ | 310/61 |
| 4,421,998 A | * | 12/1983 | Ahner et al. | ............... | 310/68 R |
| 4,611,139 A | * | 9/1986 | Godkin et al. | .............. | 310/266 |
| 5,132,581 A | * | 7/1992 | Kusase | ........................ | 310/263 |
| 5,543,677 A | * | 8/1996 | Fakler | ........................ | 310/263 |

FOREIGN PATENT DOCUMENTS

CH 460146 * 9/1968 ................ 310/263

* cited by examiner

*Primary Examiner*—Nestor Ramirez
*Assistant Examiner*—K. I. Eizo Tamai
(74) *Attorney, Agent, or Firm*—Michael J. Striker

(57) ABSTRACT

In an electrical machine, in particular a three-phase generator, with a stator (10) fastened in a housing and with a claw pole rotor system, mounted on a shaft (2), with a first pole ring (4), configured as a magnet wheel half and tapering into claws (41), and a second pole ring (3), mechanically joined to the first pole ring (4) by a nonmagnetic joining means and tapering into claws (31), as a magnet wheel half, the respective tips of the claws (31,41) of the one pole ring (3,4) extending into the interstices between the claws (41, 31) of the other pole ring (4,3), and with an exciter winding (25) associated with the pole rings (3,4) on the shaft side, in the interest of a strong, easily accessible welded join between the pole rings (3,4) the nonmagnetic joining means is a nonmagnetic plate (5) which adjoins the surface (42) of the first pole ring (4) facing away from the claws (41) of the first pole ring (4), and is joined to that surface and to the tips of the claws (31) of the second pole ring (3).

7 Claims, 1 Drawing Sheet

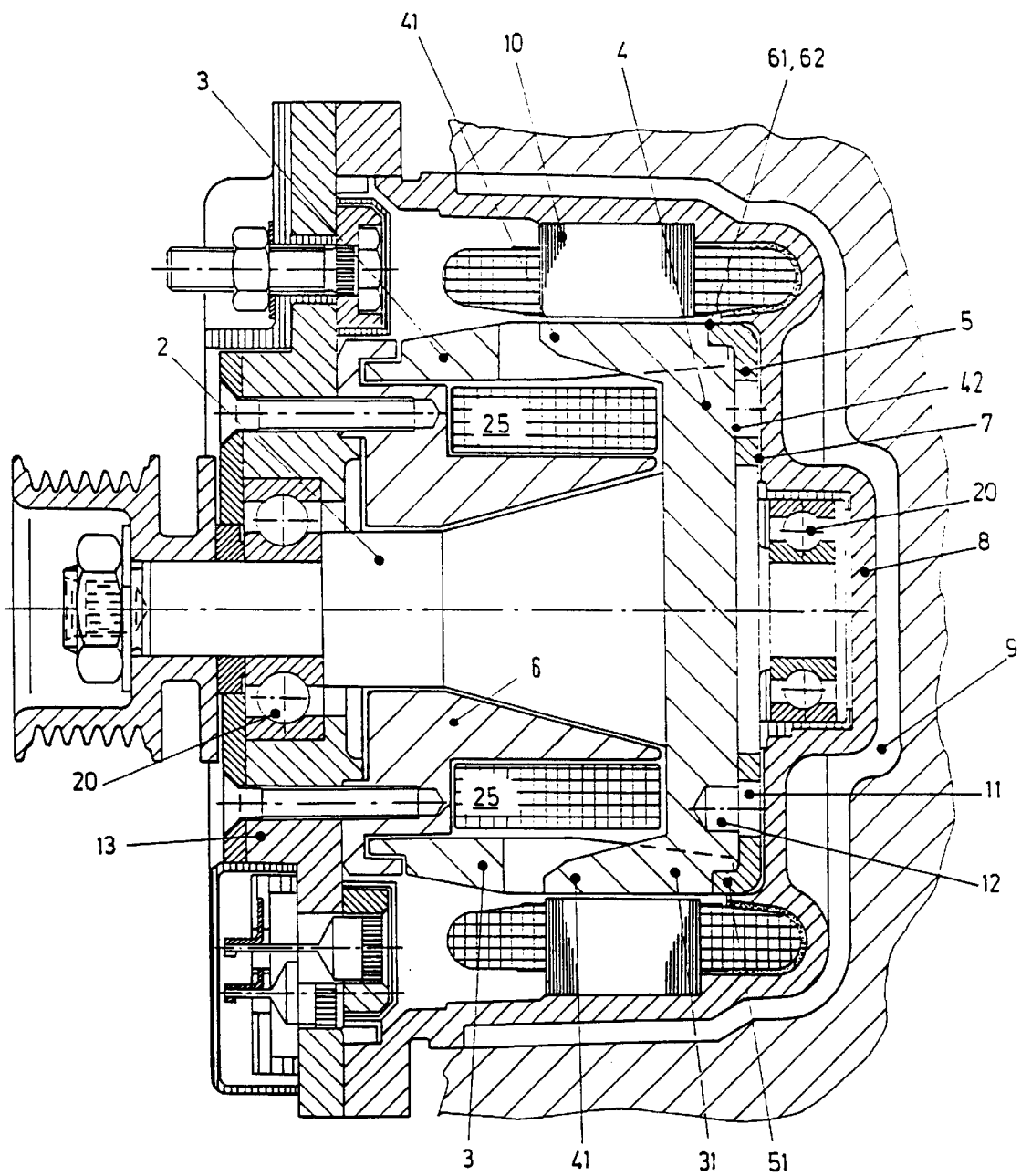

ELECTRICAL MACHINE WITH STATOR AND CLAW POLE ROTOR SYSTEM

This application is a continuation of application Ser. No. 08/663,165, filed Jun. 7, 1996, now abandoned which is a 371 of PCT/DE94/01463 Dec. 9, 1994.

PRIOR ART

The invention concerns an electrical machine, in particular a three-phase generator, according to the preamble of Claim 1.

It is known to use three-phase generators of the generic type, for example in the onboard power supply system in motor vehicles, because of their excellent maintainability, i.e. with few pans subject to wear.

The generator becomes energized by means of a stationary exciter winding which sits on the internal pole. The energizing field then magnetizes the alternately arranged rotating claws of the claw pole rotor system, also called a conductor element rotor. The principle utilized here is that the field coil wound around the internal pole energizes the entire magnetic flux, and conveys it via an air gap to the claw pole rotor system. The rotating claws must be arranged so they are magnetically insulated from, but mechanically joined to, one another.

This join between the claws of the respective magnet wheel halves is accomplished according to the prior art, as described for example in DE-OS 25 48 314, by means of a nonmagnetic ring that lies inside the claws, or by means of a plurality of nonmagnetic ring segment pieces that lie between the claws, the claws being in most cases soldered to these nonmagnetic joining elements. The arrangement of the parts being joined results, however, in solder points which are relatively difficult of access, and, in the case where ring segment pieces are used, also is a plurality of parts to be produced and joined, which makes production of the claw pole rotor complex and expensive. Also worth noting is the fact that the joins between the claws and the nonmagnetic joining elements are exposed, due to the high rotation speed of the claw pole rotor and the resulting centrifugal force, to large stresses, and must be correspondingly well made in order to minimize the risk that a join will pat and thus destroy the entire generator.

Furthermore it has already been proposed, in order to prevent deformation of the claw tips due to centrifugal force loading, to join each claw tip via a nonmagnetic joining element to the claw root, located facing it, of the respective other pole ring. But this solution also does not simplify production.

A further important consideration in the correct operation of generators of the type mentioned above is adequate cooling of the rotor system, which according to the prior art can be an air cooling or liquid cooling system and can be monitored by means of temperature sensors so that if overheating should occur an additional fan can be switched on or generator operation can be halted.

The purpose of the present invention is, among other things, to create an electrical machine in particular a three-phase generator, of the generic type that is as reliable and maintenance-free as possible due to joins of high load capacity between the joining element and the claws, and can nevertheless be constructed using a simple and economical production process. Moreover the dissipation of waste heat in the electrical machine according to the invention is intended to be simple and efficient.

ADVANTAGES OF THE INVENTION

According to the invention, the object is achieved by means of the features indicated in the characterizing portion of claim 1.

The arrangement of the nonmagnetic plate, which serves as joining element, on the surface of the first pole ring facing away from the claws of the first pole ring makes it possible first to assemble the two magnet wheel halves and then to add the plate which joins them (or vice versa), and thereafter to perform all the steps to attach the plate to the two magnet wheel halves in a single operation. Additionally resulting, between tie said surface of the first pole ring and the board, is the advantage of a large joining surface, which also favors the transfer of waste heat from the claw pole rotor to the plate, from which it can easily be dissipated via a conventional cooling system.

Preferably the join between the plate and the magnet wheel halves is made by fusion welding, which results in a highly reliable join.

Advantageously, the claws of the second pole ring are longer than the claws of the first pole ring, and extend into the interstices between the claws of the first pole ring as far as the said surface of the first pole ring. Shortening the claws of the first pole ring increases the centrifugal strength of the claw pole rotor system, since the centrifugal force load on the unattached tips of these claws is reduced. Extending the claws of the second pole ring as far as the said surface of tie first pole ring causes all the joins between the magnet wheel halves and the board to lie in one plane, so that the joining process is further simplified and can readily be automated.

Furthermore, according to the invention the nonmagnetic plate can have at its periphery an annular extension that engages into steps in the tips of the claws of the second pole ring, and in the region of the first pole ring facing away from its claws. This results in accurate, easy positioning of the parts being joined, and the joining surface area is increased.

The magnet wheel halves can be configured as forgings, into which the said steps are machined by lathe-turning. Manufacture of the magnet wheel halves is thus economical, and a precisely manufactured fitting point for the join between the board and the magnet wheel halves can nevertheless be produced. This eliminates the need for continual readjustment of welding parameters, and permits a laser welding process which causes less material distortion than conventional welding.

Preferably a narrow air gap, which allows efficient dissipation of waste heat, is provided between the nonmagnetic plate and the section of the housing running approximately parallel to it.

To reinforce the cooling effect, the nonmagnetic plate can moreover be equipped with orifices through which balance holes can also be made in the claw pole rotor.

The invention will now be explained in more detail with reference to an exemplified embodiment depicted in the attached drawing, the FIGURE showing a section through a generator with a claw pole rotor system.

DESCRIPTION OF THE EXEMPLIFIED EMBODIMENTS

The three-phase generator shown in the FIGURE has a construction that is known in terms of its basic structure, and consists of an input drive-side housing flange 13, and a housing end wall 8 facing away from the input drive side, each of which has a bearing 20 for a rotor shaft 2. A stator 10 is fastened inside the cup-shaped housing. Configured on shaft 2 is a claw pole rotor system with a first pole ring 4 which is configured as a magnet wheel half, tapers into claws 41, and is fastened on shaft 2; and a second pole ring 3, tapering into claws 31, as the further magnet wheel half, such that the respective tips of claws 31, 41 of the one pole ring 3, 4 extend into the interstices between claws 41, 31 of the other pole ring 4, 3. Arranged between claws 31, 41 of the claw pole rotor system and shaft 2 is a stationary exciter winding 25 which sits on an iron core 6 bolted immovably to flange 13.

Claws 41 of first pole ring 4 are configured with a reduced length as compared to those in known claw pole rotor systems, so that their claw spread due to centrifugal forces occurring during operation remains within the permissible range. In order to maintain the requisite coverage of stator 10 and the shortened claws 41, the stator is correspondingly offset laterally toward end wall 8 as compared to the previous construction of generators of this kind.

Claws 31 of second pole ring 3 are, conversely, longer than is usual in claw pole rotor systems, the join (preferably a weld) between the tips of claws 31 and a plate 5 made of nonmagnetic material preventing them from spreading out due to centrifugal force.

Plate 5 is arranged in annular fashion on surface 42 of first pole ring 4 facing housing end wall 8, adjacent to the said pole ring and welded thereto. Plate 5 thus joins the two magnet wheel halves 3, 4 in mechanically and magnetically insulating fashion. Claws 31 of second pole ring 3 extend over the entire length of first pole ring 4 between its claws 41 and as far as surface 42, so that the joining points of the plate to the tips of claws 31 and to pole ring 4 lie in the same axial region. As is evident from the drawing, plate 5 has an annular extension 51, pointing into the interior of the housing, that engages into steps 61 in the tips of claws 31 and into steps 62 in pole ring 4. These steps 61, 62 can be lathe-turned into pole rings 3, 4 which are fashioned as economical forgings, so that plate 5 can be fitted conformingly into polo rings 3, 4. The resulting precise fitting points between plate 5 and pole rings 3, 4 it a weld to be made with a laser welding apparatus at those points.

Provided between plate 5 and housing wall 8 is a narrow air gap 7 that transfers the waste heat occurring in the claw pole rotor to housing wall 8, from which it is dissipated through a cooling medium 9 which flows around the generator. To reinforce the cooling effect, plate 5 is equipped with orifices 11, for example six of them at a 60° spacing. This causes turbulence in the heated air inside the generator. In addition, these orifices make it possible to produce balance holes 12 on the claw pole rotor.

We claim:

1. An electrical machine, comprising a housing; a stator mounted in said housing; a throughgoing shaft; a claw pole rotor system including a first pole ring provided with claws and a second pole ring provided with claws and mechanically connected with said first pole ring through a magnetically non conductive connecting means, said pole rings being arranged so that tips of said claws of one of said pole rings extend between said claws of the other of said pole rings; a magnetically conductive core mounted on an end side of said housing; a stationary exciter winding which is arranged on said core, said second pole ring freely rotatably surrounding said exciter winding and said core at a distance from said shaft, said mechanically non conductive connecting means being formed as a single non-magnetic plate which is arranged only at an end surface of said claw pole rotor system which faces away from said claws of said first pole ring, said claws of said second pole ring extending outwardly beyond one end side of said stator, while said claws of said first pole ring end in a region of another end side of said stator.

2. An electric machine as defined in claim 1, wherein said tips of said claws of said second pole ring have steps, said non-magnetic plate having a periphery provided with an annular extension which engages into said steps in a region of said first pole ring facing away from said claws of said first pole ring.

3. An electrical machine as defined in claim 1, wherein said tips of said claws of each of said pole rings are provided with steps, said steps of said first pole ring being arranged in a region opposite to said claws of said first pole ring.

4. An electric machine as defined in claim 1, wherein said housing has a section running approximately parallel to said non-magnetic plate, said non-magnetic plate being arranged so that an air gap is formed between said non magnetic plate and said section of said housing.

5. An electric machine as defined in claim 1, wherein said non-magnetic plate is provided with orifices.

6. An electric machine as defined in claim 1, wherein one of said pole rings is fastened on said shaft, said plate being arranged at an end surface of said one pole ring which is fastened on said shaft.

7. An electrical machine as defined in claim 1, wherein, said plate is connected with said end surface and also connected with tips of said claws of said second pole ring, said claws of said second pole ring being longer than said claws of said first pole ring and extended between said claws of said first pole ring as far as said surface.

* * * * *